US012430472B2

(12) United States Patent
Li et al.

(10) Patent No.: US 12,430,472 B2
(45) Date of Patent: Sep. 30, 2025

(54) SYSTEM FOR VERIFYING EDITED IMAGE

(71) Applicants: Inventec (Pudong) Technology Corporation, Shanghai (CN); INVENTEC CORPORATION, Taipei (TW)

(72) Inventors: Ke-Han Li, Taipei (TW); Chih-Fan Hsu, Taipei (TW); Wei-Chao Chen, Taipei (TW); Ming-Ching Chang, Taipei (TW); Feng-Hao Liu, Taipei (TW)

(73) Assignees: INVENTEC CORPORATION, Taipei (TW); INVENTEC (PUDONG) TECHNOLOGY CORPORATION, Shanghai (CN)

( * ) Notice: Subject to any disclaimer, the term of this patent is extended or adjusted under 35 U.S.C. 154(b) by 180 days.

(21) Appl. No.: 18/495,122

(22) Filed: Oct. 26, 2023

(65) Prior Publication Data

US 2024/0313961 A1    Sep. 19, 2024

(30) Foreign Application Priority Data

Mar. 15, 2023   (CN) .......................... 202310251486.5

(51) Int. Cl.
  *G06F 21/64*   (2013.01)
  *G06T 7/11*    (2017.01)
  (Continued)

(52) U.S. Cl.
  CPC ................ *G06F 21/64* (2013.01); *G06T 7/11* (2017.01); *G06T 11/00* (2013.01); *H04L 9/088* (2013.01);
  (Continued)

(58) Field of Classification Search
  CPC ....................................................... G06F 21/64
  See application file for complete search history.

(56) References Cited

U.S. PATENT DOCUMENTS

| 2002/0060736 | A1* | 5/2002 | Wakao | ............... | H04N 1/32128 |
| | | | | | 348/207.99 |
| 2004/0264734 | A1* | 12/2004 | Wakao | ................. | G06T 1/0007 |
| | | | | | 382/100 |

(Continued)

OTHER PUBLICATIONS

Assa Naveh, Eran Tromer, PhotoProof: cryptographic image authentication for any set of permissible transformations, proc. IEEE Symposium on Security & Privacy (Oakland) 2016, 17 pgs.

*Primary Examiner* — Bradley W Holder
(74) *Attorney, Agent, or Firm* — Muncy, Geissler, Olds & Lowe, P.C.

(57) ABSTRACT

A system for verifying edited image includes: a producer terminal device configured to tile a source image for a plurality of smaller tiled images with individual source image hash values to accordingly calculate an integrated source image hash value, and to execute digitally signing to generate an image tag pair; an editor terminal device configured to receive the image tag pair, to divide the source image into these smaller tiled images according to a tile configuration, to edit part of the smaller tiled images, to include the rest part of these smaller tiled images to generate an edited integral image and further calculate an integrated edit image hash value, and to execute digitally signing to generate a zero-knowledge proof (ZKP) assurance; and, a user terminal device configured to receive the ZKP assurance to accordingly verify whether or not the edited integral image is generated by editing the source image.

10 Claims, 16 Drawing Sheets

(51) Int. Cl.
  *G06T 11/00* (2006.01)
  *H04L 9/08* (2006.01)
  *H04L 9/30* (2006.01)
(52) U.S. Cl.
  CPC ...... *H04L 9/30* (2013.01); *G06T 2207/20021* (2013.01); *G06T 2207/20221* (2013.01)

(56) References Cited

U.S. PATENT DOCUMENTS

2006/0248348 A1* 11/2006 Wakao ............... H04N 1/32101
  713/186
2011/0243458 A1* 10/2011 Yoshioka ................ G09C 5/00
  382/209

* cited by examiner

SYSTEM FOR VERIFYING EDITED IMAGE

This application claims the benefit of China Patent Application Serial No. 202310251486.5, filed Mar. 15, 2023, the subject matter of which is incorporated herein by reference.

BACKGROUND OF THE INVENTION

(1) Field of the Invention

The invention relates to a verification system, and more particularly to a system that is used to verify whether or not an edited integral image is formed from editing a source image.

(2) Description of the Prior Art

With the development of multimedia and social media, the function of image and video sharing has been added. Despite the ease of sharing, digital content might easily be maliciously modified. Accordingly, not only it is easy to cause the proliferation of false information, but it also poses serious challenges to the protection of privacy rights such as personal data and portraits. In order to overcome the problem caused by image modifications, various image authentication methods are gradually developed to verify the source, integrity and authenticity of images. Although some image authentication methods can verify whether or not the source image has been modified, yet it cannot be distinguished whether these modifications are malicious or authorized.

In addition, in order to implement the protection of privacy rights such as personal data and portraits, technologies such as electronic watermarking, digital signatures and cutting-edge cryptography have been applied to authenticate and confirm the editing upon the source images. Among them, a recent technology proposed by A. Naveh and E. Tromer at the Security and Privacy Symposium in 2016 (PhotoProof technology hereinafter) is introduced.

In "PhotoProof technology", although it is possible to verify whether or not the editing of the image is properly authorized or has protected some privacy issues. However, due to the constraints of encrypting and decrypting the entire edit image, execution time of related mathematical calculation is too long, and thus a problem of efficiency in image verification would be inevitable.

SUMMARY OF THE INVENTION

In view that, in the previous technology of verifying whether or not the editing of the image has been properly authorized and protect some privacy rights, a problem of efficiency in image verification is always accompanied. Accordingly, it is an object of the present invention to provide a system for verifying edited image that includes a producer terminal device, an editor terminal device and a user terminal device.

The producer terminal device, stored with a private key and a public key, is configured for providing a source image, and editing the source image into a plurality of tiled images according to a tile configuration.

The producer terminal device is also configured for providing the plurality of tiled images individually with a plurality of source image hash values according to an operation order structure for generating a tile editing data. The producer terminal device is also configured for calculating the plurality of source image hash values to generate an integrated source image hash value according to the operation order structure. The integrated source image hash value is signed by the private key to generate an authentication tag, and the source image and the authentication tag are bound to form an image-tag pair.

The editor terminal device, connected signally with the producer terminal device, is configured for receiving the tile editing data and the image-tag pair, receiving the public key defined further as an editor-end public key, and tiling the source image into a plurality of tiles according to the plurality of tiled images of the tile editing data.

The editor terminal device is also configured for dividing the plurality of tiles into at least one non-edited tile and at least one original tile. The at least one said source image hash value corresponding to the at least one non-edited tile is defined as at least one non-edited region hash value, and at least one of the rest of the plurality of source image hash values corresponding to the at least one original tile is defined as at least one original hash value.

The editor terminal device is also configured for an editor to edit the at least one non-edited tile into at least one edited tile, and the at least one edited tile and the at least one original tile are bound into an edited integral image according to the tile configuration. The at least one non-edited region hash value and the at least one original hash value are calculated to generate an integrated edit image hash value according to the operation order structure. After the integrated edit image hash value is compared to the authentication tag and a positive result is obtained, the editor-end public key is used to sign so as to generate a zero-knowledge proof (ZKP) assurance.

The user terminal device, connected signally with the producer terminal device and the editor terminal device, is configured for receiving the public key from the producer terminal device to be defined further as a source-end public key, receiving the zero-knowledge proof (ZKP) assurance and the edited integral image from the editor terminal device, and verifying, according to the source-end public key and the zero-knowledge proof (ZKP) assurance, whether or not the edited integral image is obtained from editing the source image.

In one embodiment of this invention, the producer terminal device is installed with an android package kit. After the android package kit is executed, a hash computation module is created to calculate the plurality of source image hash values for generating the integrated source image hash value, according to the operation order structure.

In one embodiment of this invention, the producer terminal device is installed with an android package kit. After the android package kit is executed, a signature module is created to utilize the private key to sign the integrated source image hash value for generating the authentication tag, and the source image and the authentication tag are combined to be the image-tag pair.

In one embodiment of this invention, the editor terminal device is installed with an android package kit. After the android package kit is executed, an image tiling module is created. The image tiling module tiles the source image into the plurality of tiles according to the plurality of tiled images of the tile editing data, the plurality of tiles are further divided into the at least one non-edited tile and the at least one original tile, the at least one source image hash value corresponding to the at least one non-edited tile is defined as the at least one non-edited region hash value, and the at least one of the rest of the plurality of source image hash values corresponding to the at least one original tile is defined as the at least one original hash value.

In one embodiment of this invention, the editor terminal device is installed with an android package kit. After the android package kit is executed, a first zero-knowledge proof module including an image edit unit is created, and the image edit unit is provided for the editor to edit the at least one non-edited tile into the at least one edited tile.

In one embodiment of this invention, the first zero-knowledge proof module further includes an image synthesis unit, and the image synthesis unit produces the edited integral image by binding the at least one edited tile and the at least one original tile according to the tile configuration.

In one embodiment of this invention, the first zero-knowledge proof module further includes a hash computation unit, and the integrated edit image hash value is obtained by having the hash computation unit to calculate the at least one non-edited region hash value and the at least one original hash value according to the operation order structure.

In one embodiment of this invention, the first zero-knowledge proof module further includes an assurance generation unit. After the assurance generation unit compares the integrated edit image hash value to the authentication tag and obtains a positive result, the editor-end public key is used to sign for generating the zero-knowledge proof (ZKP) assurance.

In one embodiment of this invention, the user terminal device is installed with an android package kit, a second zero-knowledge proof module is created after the android package kit is executed, and the second zero-knowledge proof module is to verify, according to the source-end public key and the zero-knowledge proof (ZKP) assurance, whether or not the edited integral image is obtained from editing the source image.

In one embodiment of this invention, preferably, the operation order structure is a Merkle-tree operation order structure, the plurality of source image hash values are calculated to generate the integrated source image hash value according to the Merkle-tree operation order structure, and the at least one non-edited region hash value and the at least one original hash value are also calculated to generate the integrated edit image hash value according to the Merkle-tree operation order structure.

As stated, in the image-editing verification technique provided in this disclosure, since the source image is tiled into a plurality of smaller tiles with individual source image hash values, thus only part of these smaller tiles need to be edited. In addition, the hash computations and comparisons are carried out before and also after the editing so as to verify whether or not the edited integral image is obtained from editing the original source image. Further, by integrating the key comparisons and zero-knowledge proof technology, only the operator of the producer terminal device and the editor terminal device can have a full look of the source image, such that the original content of the source image can be protected from the user and the public persons. Thereupon, advantages in privacy protection at personal data and portraits can be obtained. Also, due to the tiling process, after experiments, evidences have been found in saving the computation time and in reducing the storage space, and thus the effect of improving the efficiency of image verification in this disclosure is achieved.

All these objects are achieved by the system for verifying edited image described below.

BRIEF DESCRIPTION OF THE DRAWINGS

The present invention will now be specified with reference to its preferred embodiment illustrated in the drawings, in which:

FIG. 3 has been tiled into a plurality of tiles (or tiled images) in accordance with the present invention;

DESCRIPTION OF THE PREFERRED EMBODIMENT

The invention disclosed herein is directed to a system for verifying edited image. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Since the technique for verifying the edited image provided by the present invention can be widely used to judge whether various edited images are indeed generated by editing the real source image, rather than fabricated out of some other sources, thus the applications are quite wide. However, to concisely explain this technique, only a preferred verification system and a corresponding verification method will be raised as typical embodiments for the descriptions of this invention. In addition, these embodiments are particularly used to facilitate and clearly illustrate the purpose and effect of the present invention.

Figure 1:
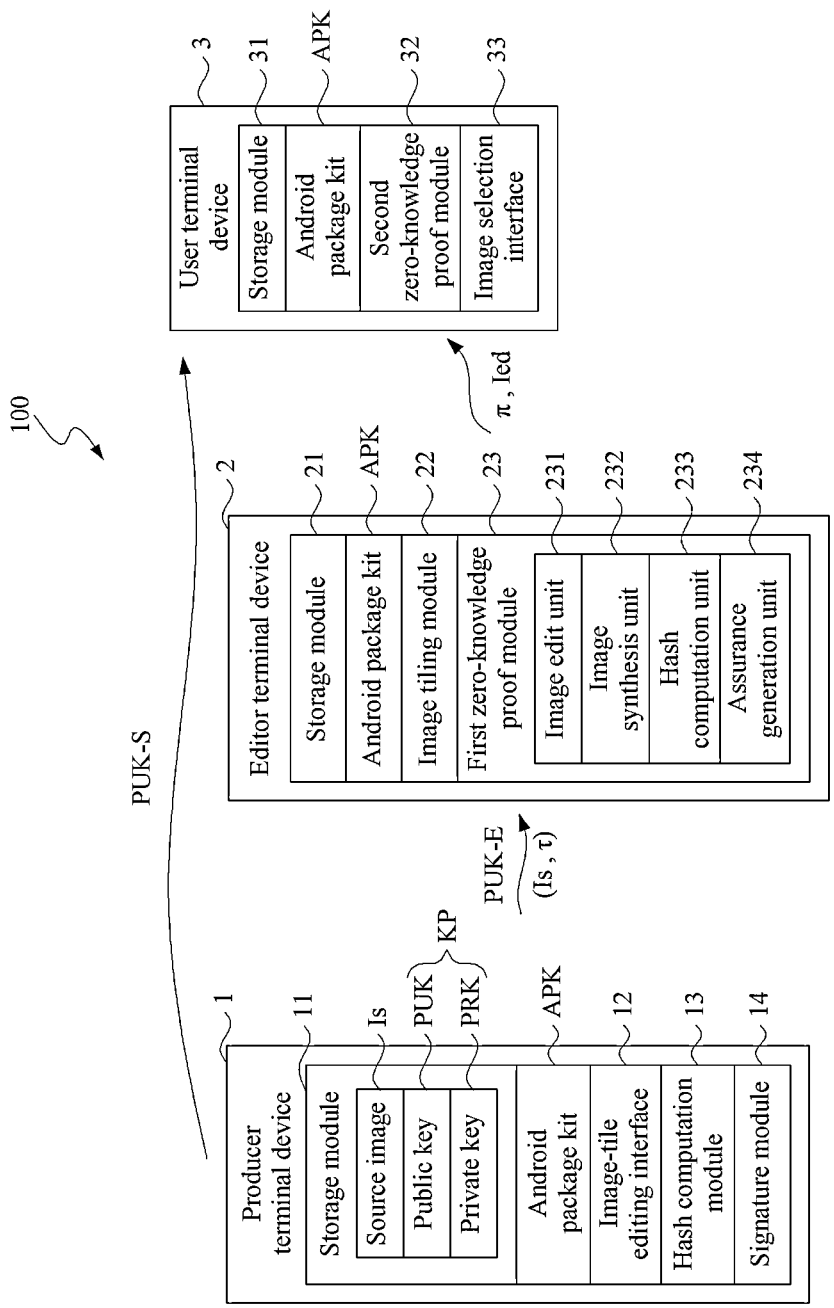
FIG. 1 is a schematic block view of a preferred embodiment of the system for verifying edited image in accordance with the present invention.

Referring to FIG. 1, a schematic block view of a preferred embodiment of the system for verifying edited image in accordance with the present invention is shown. In FIG. 1, a system for verifying edited image ("verification system"

hereinafter) 100 includes a producer terminal device 1, an editor terminal device 2 and a user terminal device 3, and is incorporated with an android package kit APK.

The producer terminal device 1 includes a storage module 11, and is installed with the android package kit APK. The storage module 11 stores a key pair KP and a plurality of source images Is. The key pair KP can include a public key PUK and a private key PRK. The source images Is can be images directly captured by the producer terminal device 1 or images received from other image-capturing devices such as digital cameras, network cameras, mobile phones, tablet computers or any device capable of capturing digital images.

Figure 3:
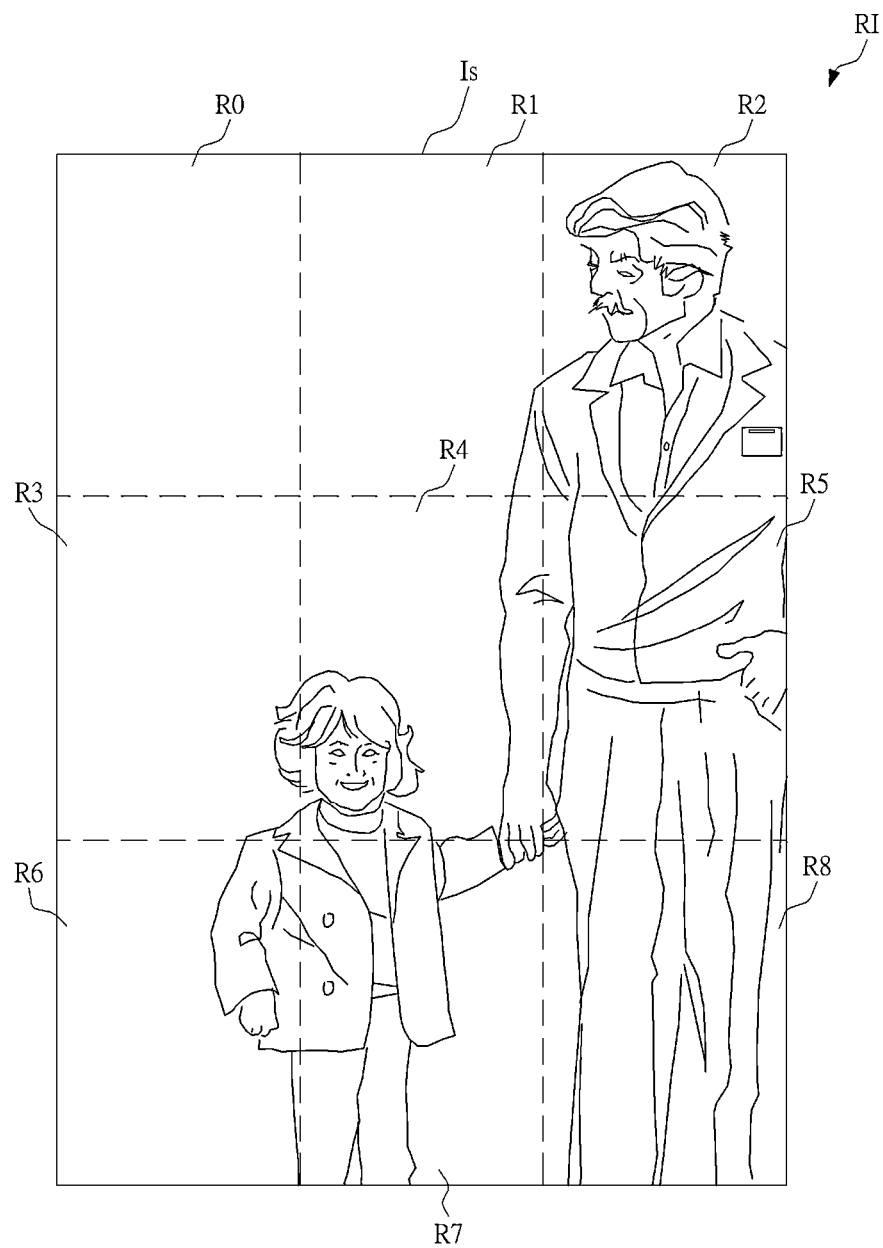
FIG. 3 shows schematically one of tile configurations upon the source image of FIG. 2 in accordance with the present invention.

After the producer terminal device 1 executes the android package kit APK, an image-tile editing interface 12, a hash computation module 13 and a signature module 14 would be generated. The image-tile editing interface 12 is configured to edit a source image Is into tiled images R0~R8 according to a specific tile configuration (for example, as shown in FIG. 3), and to generate a tile editing data according to an operation order structure by referring source image hash values H0~H8 to the corresponding tiled images R0~R8.

TABLE 1

Tile editing data

| tiled images | Image size | Diagonal pixel coordinate range | Source image hash values |
| --- | --- | --- | --- |
| R0 | 300 × 480 | (001, 001)~(300, 480) | H0 |
| R1 | 300 × 480 | (301, 001)~(600, 480) | H1 |
| R2 | 300 × 480 | (601, 001)~(900, 480) | H2 |
| R3 | 300 × 480 | (001, 481)~(300, 960) | H3 |
| R4 | 300 × 480 | (301, 481)~(600, 960) | H4 |
| R5 | 300 × 480 | (601, 481)~(900, 960) | H5 |
| R6 | 300 × 480 | (001, 961)~(300, 1440) | H6 |
| R7 | 300 × 480 | (301, 961)~(600, 1440) | H7 |
| R8 | 300 × 480 | (601, 961)~(900, 1440) | H8 |

In the tile editing data as listed in Table 1, the tile configuration can be preset by the android package kit APK, or inputted manually by an image provider of the producer terminal device 1. In this embodiment, the data are manually inputted by an image provider, and the tile configuration adopts a 3×3 equal-dividing arrangement. According to this 3×3 equal-dividing arrangement, a whole image RI with an image size of 900×1440 is divided into 9 tiled images R0~R8, and each of the tiled images R0~R8 has an image size of 300×480 and a source image hash value H0~H8.

In order to further define clearly position relationships between the tiled images, the tile editing data further define a diagonal pixel coordinate range (from an upper left corner to a corresponding lower right corner) for each of the tiled images R0~R8, in which the diagonal pixel coordinate range (from the upper leftest corner to the lower rightest corner) for the whole image RI is (001,001)~(900,1440).

The hash computation module 13 would base on the operation order structure to generate an integrated source image hash value HI from calculating the source image hash values H0~H8. In this embodiment, a Merkle-tree operation order structure is adopted for the operation order structure. Namely, this two-level tree-structured hash computation would be applied. In a first level hash computation, three first level hash values HM0~HM2 would be generated. The source image hash values H0~H2 are first utilized to perform the first level hash computation for generating the first level hash value HM0, the source image hash values H3~H5 are then utilized to perform the first level hash computation for generating the first level hash value HM1, and finally the source image hash values H6~H8 are utilized to perform the first level hash computation for generating the first level hash value HM2. While in the second level hash computation, the aforesaid three first level hash values HM0~HM2 are utilized to perform the second level hash computation for generating the integrated source image hash value HI.

Practically, the aforesaid operation order structure can be adjusted according to the number of the tiled images. For example, if the number of the tiled images is 3 (i.e., three source image hash values H1'~H3'), a direct concatenation can be applied to the operation order structure. Namely, the source image hash values H1' and H2' are applied to perform one hash computation, and then the hash computation result is integrated with the source image hash value H3' to undergo another hash computation to further obtain the aforesaid integrated source image hash value HI'. In addition, an odd-even concatenation can be applied to integrate the operation order structure and the other operation order structure.

The signature module 14 utilizes a private key PRK to signature the integrated source image hash value HI so as to generate an authentication tag t, and then the source image Is and the authentication tag t are bound together as an image-tag pair (Is,τ).

The editor terminal device 2 has a storage module 21, and is installed with an android package kit APK. After being connected signally with the producer terminal device 1, the editor terminal device 2 can receive the tile editing data (as listed in Table 1) and the image-tag pair (Is,τ), and also the public key PUK from the producer terminal device 1 so as to define an editor-end public key PUK-E.

After the editor terminal device 2 executes the android package kit APK, an image tiling module 22 and a first zero-knowledge proof module 23 would be created. The first zero-knowledge proof module 23 includes an image edit unit 231, an image synthesis unit 232, a hash computation unit 233 and an assurance generation unit 234.

Figure 4:
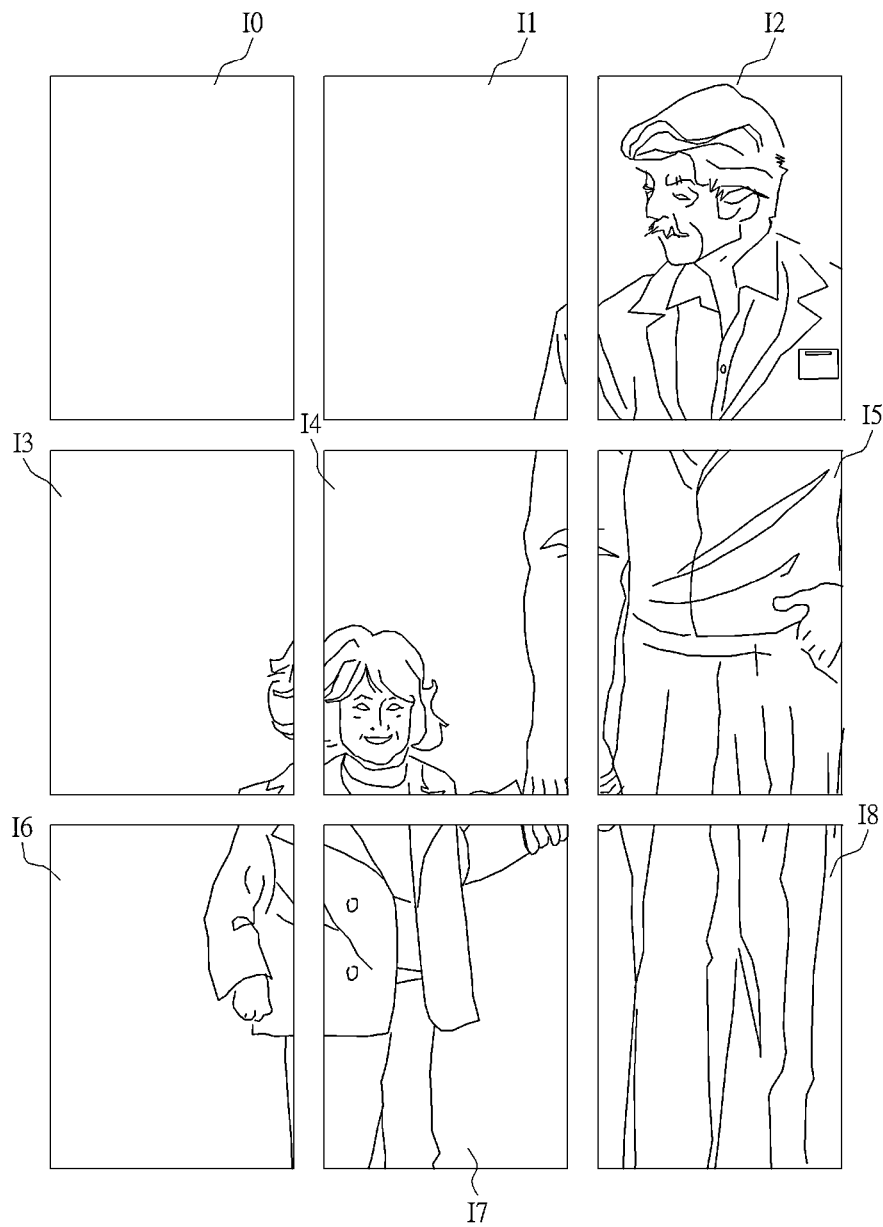
FIG. 4 illustrates schematically that the source image of FIG. 2.
Figure 5:
FIG. 5 illustrates schematically one of non-edited tiles in FIG. 4.
Figure 7:
FIG. 7 illustrates schematically another non-edited tile in FIG. 4.

The image tiling module 22 would base on the tiled images R0~R8 of the tile editing data (as listed in Table 1) to tile or divide the source image Is into smaller tiles I0~I8 (as shown in FIG. 4), and these tiles I0~I8 are further defined as non-edited tiles or original tiles. In this embodiment, since the tiles 12 and 14 might entangle an issue of portrait rights and personal data (particularly those of non-public people), thus these two tiles shall be further edited to define them to be non-edited tiles Ie2 and Ie4, respectively (as shown in FIG. 5 and FIG. 7). On the other hand, the tiles I0, I1, I3 and I5~I8 need no additional editing, and thus would be defined as original tiles Io0, Io1, Io3 and Io5~Io8, respectively. It shall be understood that the content of the personal data shown in FIG. 5 is simply fabricated only for the purpose of explanation, and any similarity is purely coincidental.

Since the source image hash values H2 and H4 corresponding to the non-edited tiles Ie2 and Ie4 in the editing area are defined as hash value He2 and He4, respectively. On the other hand, the source image hash values H0, H1, H3 and H5~H8 corresponding to the original tiles Io0, Io1, Io3 and Io5~Io8 in the non-editing area would be defined as original hash value Ho0, Ho1, Ho3 and Ho5~Ho8, respectively.

Figure 6:
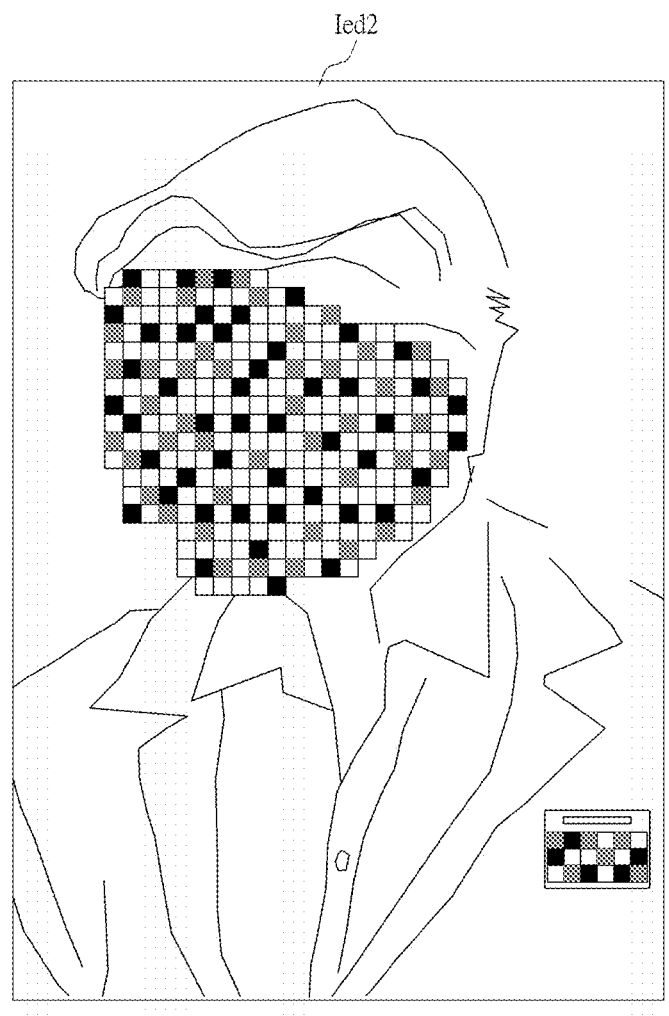
FIG. 6 illustrates schematically an edited tile formed by mosaic-processing the non-edited tile of FIG. 5.
Figure 8:
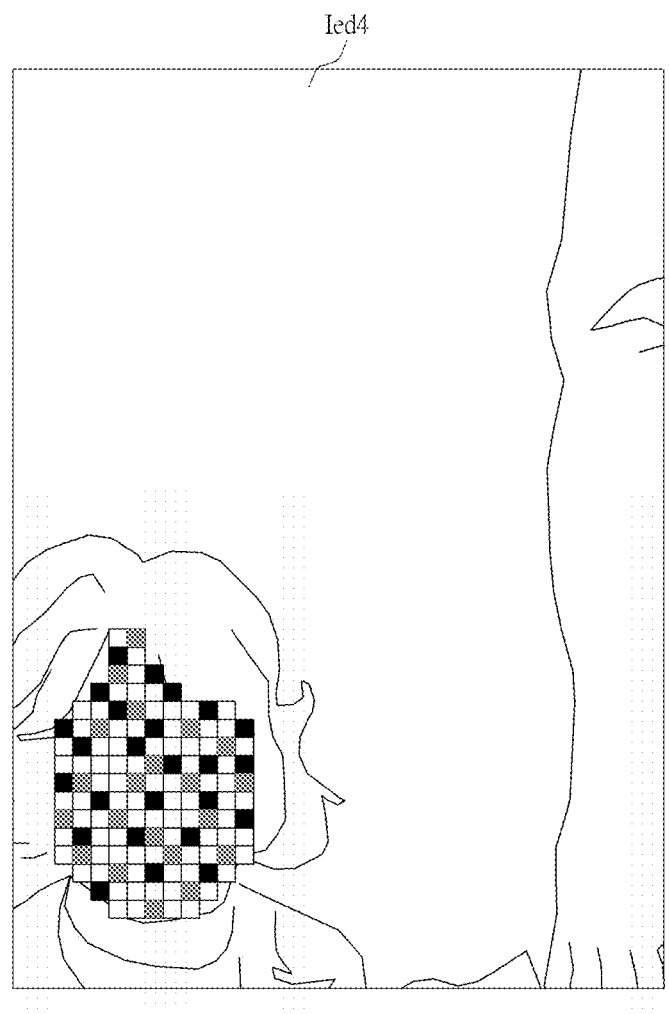
FIG. 8 illustrates schematically another edited tile formed by mosaic-processing the non-edited tile of FIG. 7.
Figure 11:
FIG. 11 and FIG. 12 illustrate schematically another edited tiles of FIG. 6 and FIG. 8, respectively, formed by another tile processing means.
Figure 12:

The image edit unit 231 is configured for the editor to manipulate the non-edited tiles into the edited tiles. In one of many applications of this embodiment, the mosaic processing for editing the non-edited tiles Ie2 and Ie4 in the sensitive area would be used to form the edited tiles Ied2 and Ied4, as shown in FIG. 6 and FIG. 8, respectively. In addition, in another application of this embodiment, other processing methods such as ways to replace portraits with cartoons, caricatures or animal figures can be used to edit and form edited tiles Ied2' and Ied4', as shown in FIG. 11 and FIG. 12, respectively, so as not to infringe the portrait rights. Alternatively, the personal data may be symbolized (i.e., by replacing part of real data with symbols ○, as shown in FIG. 11) so as not to disclose the personal data.

Figure 9:
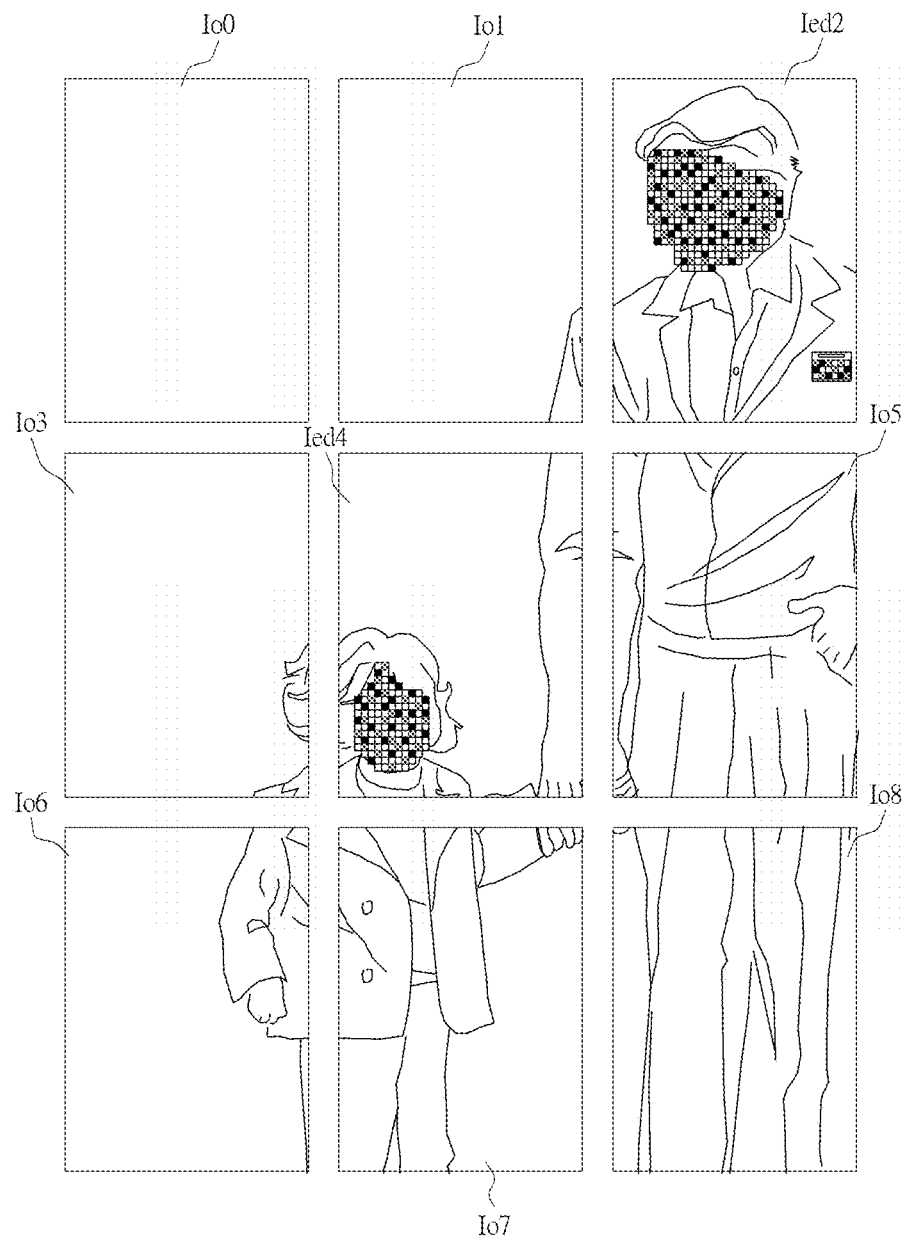
FIG. 9 shows schematically that FIG. 4 has been re-arranged to include the edited tiles of FIG. 6 and FIG. 8 and the other original tiles according to the tile configuration.
Figure 10:
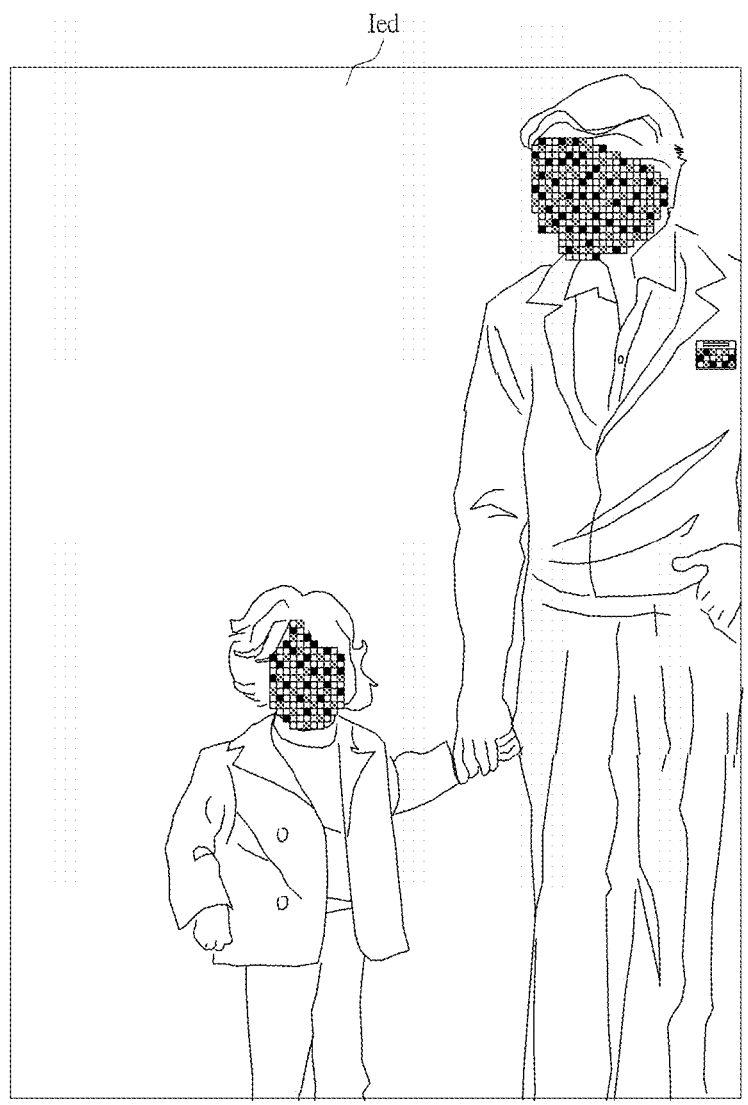
FIG. 10 shows schematically an assembly state of FIG. 9.
Figure 13:
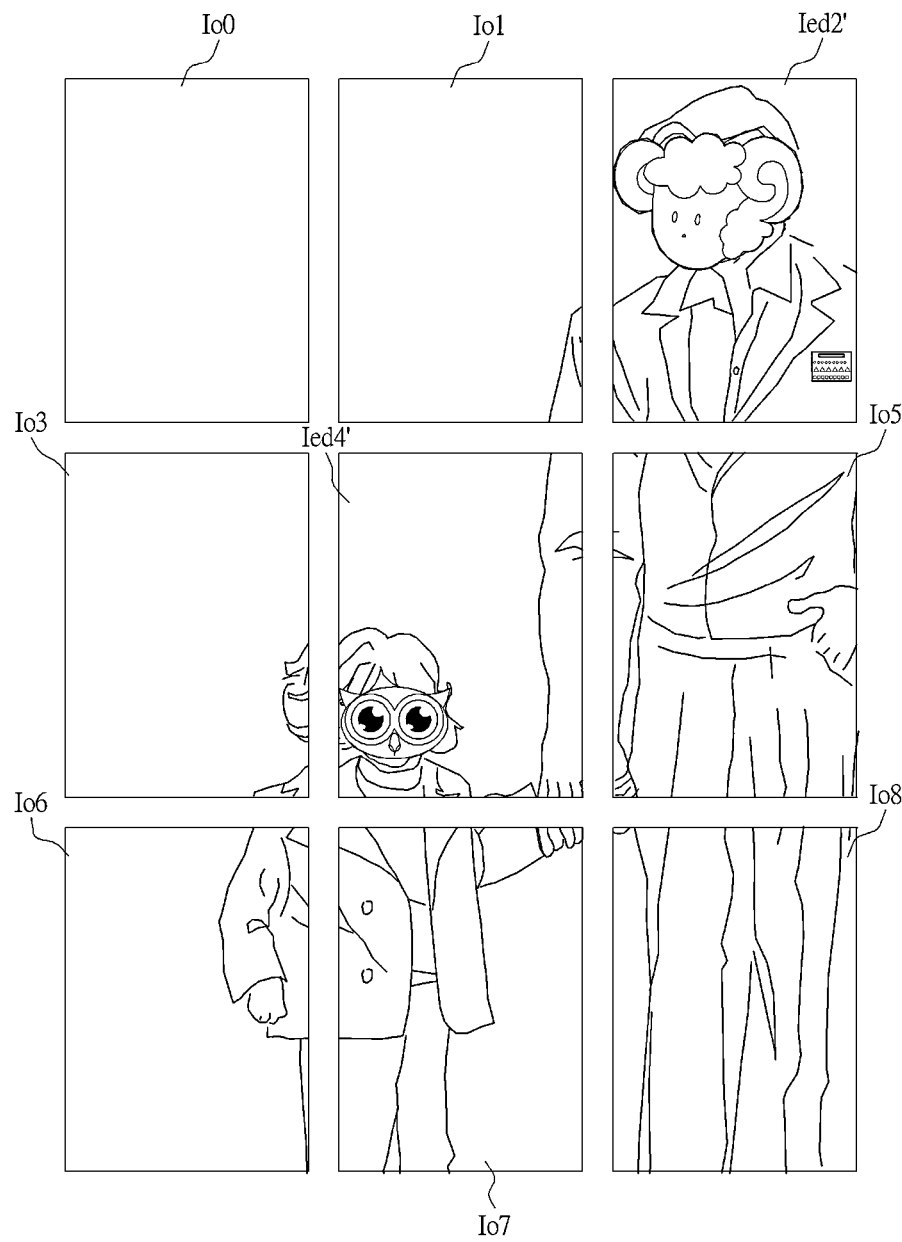
FIG. 13 shows schematically that FIG. 4 has been re-arranged to include the edited tiles of FIG. 11 and FIG. 12 and the other original tiles according to the tile configuration.

The image synthesis unit 232 is configured to stitch the edited tiles Ied2, Ied4 and the original tiles Io0, Io1, Io3 and Io5~Io8 together into an edited integral image Ied (as shown in FIG. 10), according to the tile configuration (i.e., the 3×3 arrangement as shown in FIG. 9) and the diagonal pixel coordinate ranges of the tile editing data. In this embodiment, the edited tiles Ied2 and Ied4 are corresponding to the diagonal pixel coordinate ranges of the tiled images R2 and R4 (labeled in FIG. 3); and, the original tiles Io0, Io1, Io3 and Io5~Io8 are corresponding to the diagonal pixel coordinate ranges of the tiled images R0, R1, R3 and R5~R8 (also labeled in FIG. 3). Alternatively, with the edited tiles Ied2', Ied4' and the original tiles Io0, Io1, Io3 and Io5~Io8 (as shown in FIG. 13), another edited integral image can be obtained, according to the tile configuration (i.e., the 3×3 equal-tiled arrangement) and the diagonal pixel coordinate ranges of the tile editing data.

The hash computation unit 233 would follow the operation order structure to perform calculations upon the hash values He2, He4 in the editing area and the original hash values Ho0, Ho1, Ho3 and Ho5~Ho8 so as to obtain an integrated edit image hash value HeI. In this embodiment, the same Merkle-tree operation order structure used in the hash computation module 13 is applied. Namely, two levels of the tree-type hash computation are performed. At the first level of the hash computation, three first-level hash values HMe0~HMe2 are derived. The original hash values Ho0, Ho1 and the edit-area hash value He2 are used to perform the first-level hash computation so as to obtain a first-level hash value HMe0. Then, the original hash value Ho3, the edit-area hash value He4 and the original hash value Ho5 are used to perform the first-level hash computation for obtaining a first-level hash value HMe1, and further the original hash values Ho6~Ho8 are used to perform the first-level hash computation for obtaining a first-level hash value HMe2. At the second level of the hash computation, the aforesaid three first-level hash values HMe0~HMe2 are applied to perform the second-level hash computation so as to obtain the integrated edit image hash value HeI.

Similarly, if the operation order structure adopted by the hash computation module 13 is a direct concatenation, an odd-even concatenation or any other operation order structure, the hash computation unit 233 would follow the hash computation module 13 to apply the same operation order structure.

After the assurance generation unit 234 compares the integrated edit image hash value HeI and the authentication tag t (including the integrated source image hash value HI) and obtains a positive result, the editor-end public key PUK-E is used to sign so as to generate a zero-knowledge proof (ZKP) assurance ("photo assurance" hereinafter) π.

The user terminal device 3 is equipped with a storage module 31, and installed with an android package kit APK. The android package kit APK is executed to create a second zero-knowledge proof module 32 and an image selection interface 33. The user terminal device 3, connected signally with the producer terminal device 1 and the editor terminal device 2, can be used to receive the public key PUK from the producer terminal device 1 so as to define a source-end public key PUK-S, and the photo assurance π and the edited integral image Ied from the editor terminal device 2.

The second zero-knowledge proof module 32 is to evaluate the source-end public key PUK-S and the photo assurance π (including the editor-end public key PUK-E) to verify whether or not the edited integral image Ied is obtained from editing the source image Is. In this embodiment, the verification can include a determination upon whether or not the editor-end public key PUK-E and the source-end public key PUK-S are identical, and the integrated edit image hash value HeI and the integrated source image hash value HI are the same. In addition, the verification can be another method that is based on the source-end public key PUK-S and the zero-knowledge proof (ZKP) assurance 1.

Practically, the editor terminal device 2 can receive various source images from different producer terminal devices 1.0. However, a producer terminal device 1 may provide different source images to the same editor terminal device 2. If the edited integral image Ied is not obtained from editing the source image Is, it implies that the edited integral image Ied is not provided by the provider of the source image Is (i.e., the operator of the producer terminal device 1), or the edited integral image Ied is provided by the operator of the producer terminal device 1, but not corresponding to the source image Is. If the edited integral image Ied is not provided by the provider of the source image Is, then the editor-end public key PUK-E and the source-end public key PUK-S are surely different. If the edited integral image Ied is provided by the operator of the producer terminal device 1 but not corresponding to the source image Is, then the integrated edit image hash value HeI and the integrated source image hash value HI would be different. If there exists any negative comparison, then the verification would be negative.

After the second zero-knowledge proof module 32 has verified that the edited integral image Ied is obtained from editing the source image Is, the image selection interface 33 is configured for a user to select the receiving of the edited integral image Ied. In addition, alternatively, after the edited integral image Ied is received, all the received source-end public key PUK-S, photo assurance π and edited integral image Ied are stored into the storage module 31 for future reference.

Any of the aforesaid producer terminal device 1, editor terminal device 2 and user terminal device 3 can be smart phones, tablet computers, personal computers, notebook computers or other terminal electronic devices that can directly or indirectly carry out cable or wireless communication. The aforesaid storage modules 11, 21 and 31 can be memories, memory cards or other electronic devices for permanent, time-limited or temporary storage of digital data.

Since all the aforesaid image-tile editing interface 12, hash computation module 13, signature module 14, image tiling module 22, first zero-knowledge proof module 23 (including an image edit unit 231, an image synthesis unit 232, a hash computation unit 233 and an assurance generation unit 234), second zero-knowledge proof module 32 and image selection interface 33 are created by executing the android package kit APK, thus, essentially, they all belong to (or at least part of) the main program, sub-program or plug-in sub-program in the android package kit APK. Relevant program logic is as described above, and those who have common knowledge in the field of program edit technology can write corresponding main programs, sub-programs or plug-in auxiliary programs according to the above-mentioned relevant program logic for specific implementation.

All the aforesaid source image Is, tiles I0~I8, non-edited tiles Ie2, Ie4, original tiles Io0, Io1, Io3, Io5~Io8, edited tiles Ied2, Ied4 and edited integral image Ied essentially belong to digital image data (files), and the ones marked in the diagram are the images displayed on the display interface after the digital image data (files) are opened by an image display application.

Figure 2:
FIG. 2 shows schematically one of the source images for the preferred embodiment of FIG. 1.
Figure 14:
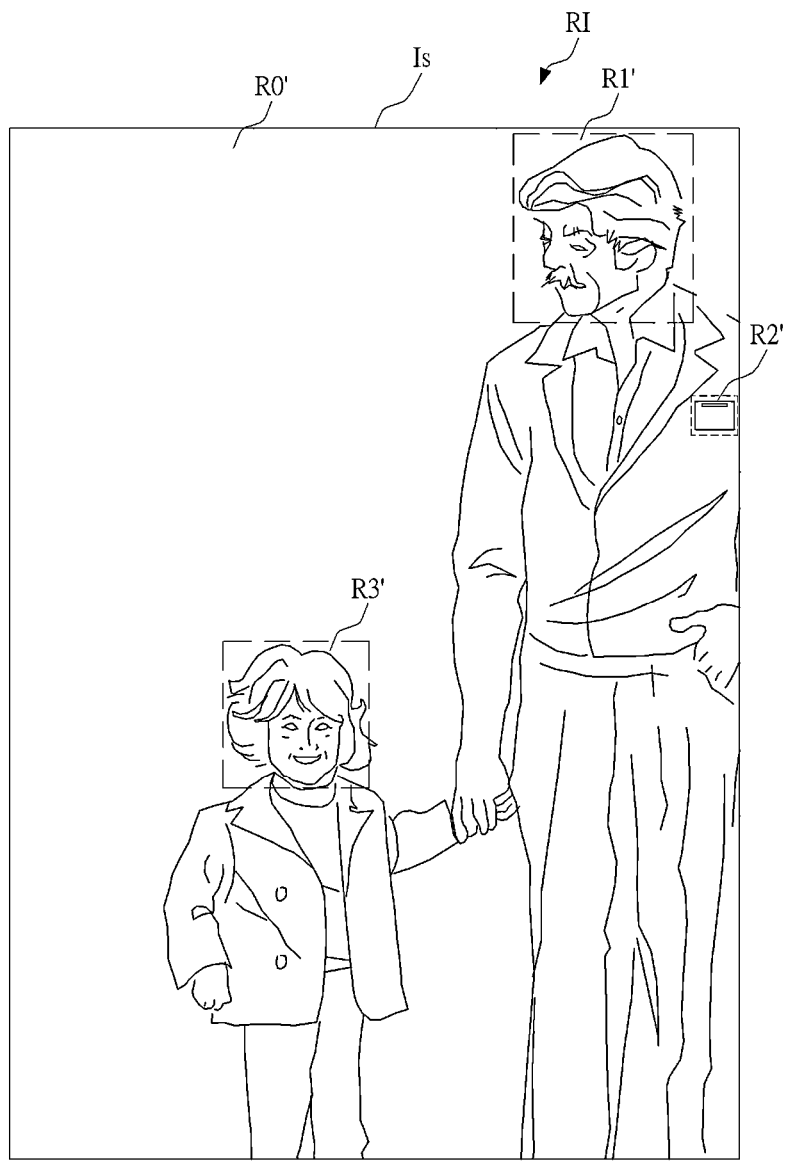
FIG. 14 illustrates schematically another image-tile arrangement upon FIG. 2 obtained by introducing the image-tile editing interface to manually divide the tiled images.

In addition, referring to FIG. 14, another image-tile arrangement upon FIG. 2 obtained by introducing the image-tile editing interface to manually divide the tiled images is illustrated schematically. The tile configuration adopted by the image-tile editing interface 12 can be the aforesaid 3×3 equal-tiled arrangement, or another arrangement that can provide an image provider of the producer terminal device 1 to manually define (for example, directly through a mouse) different sizes of tiled images R0'~R3' for further tiling the source image Is. In the latter arrangement, the tiled images R0' do not need to be further edited, and the tiled images R1'~ R3' need to be further edited. It shall be understood that there might exist some other arrangements for tiling, but, it is believed, the related operations thereof would be similar to the aforesaid descriptions, and thus details thereabout would be omitted herein.

Figure 15A:
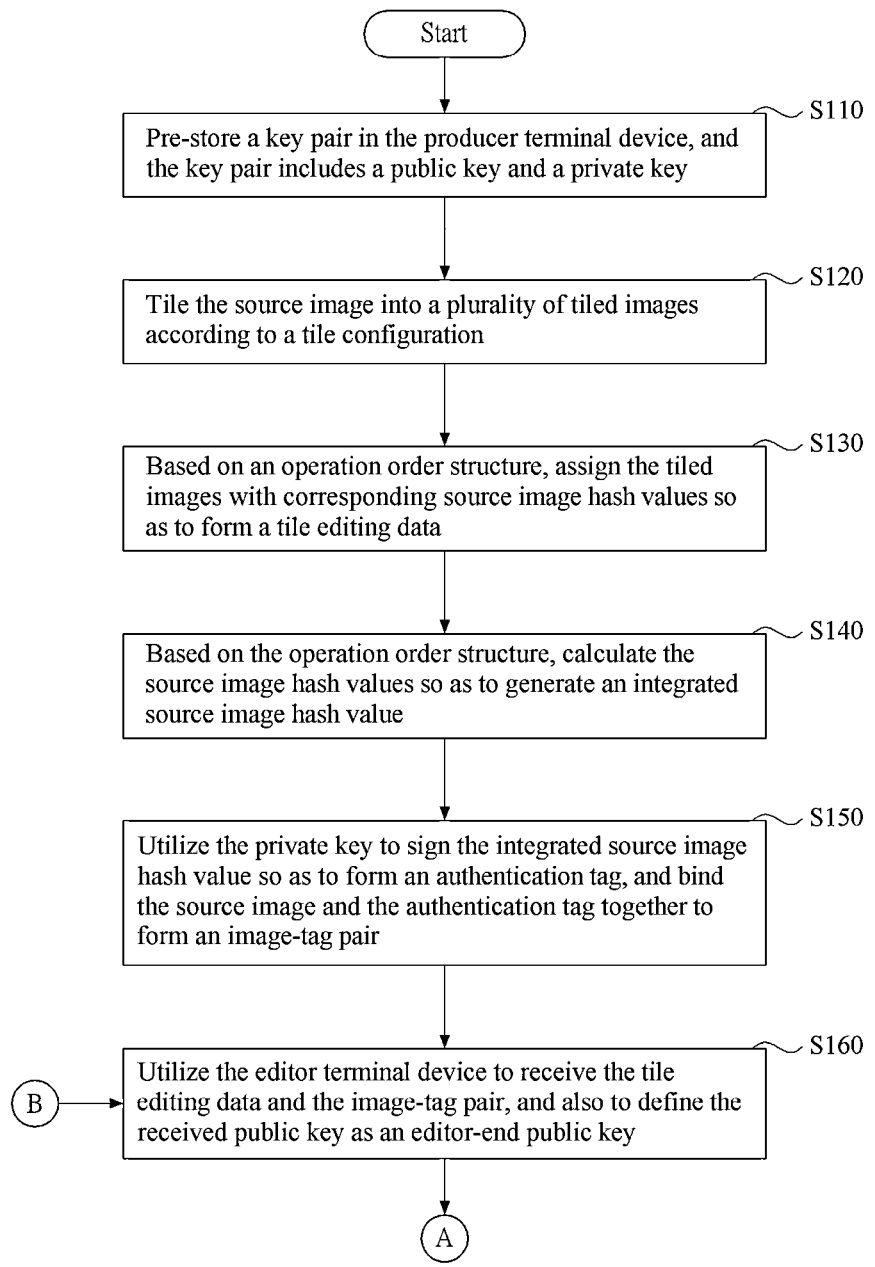
FIG. 15A and FIG. 15B are integrated to show schematically a simplified flowchart of a preferred embodiment of the method for verifying edited image in accordance with the present invention.
Figure 15B:
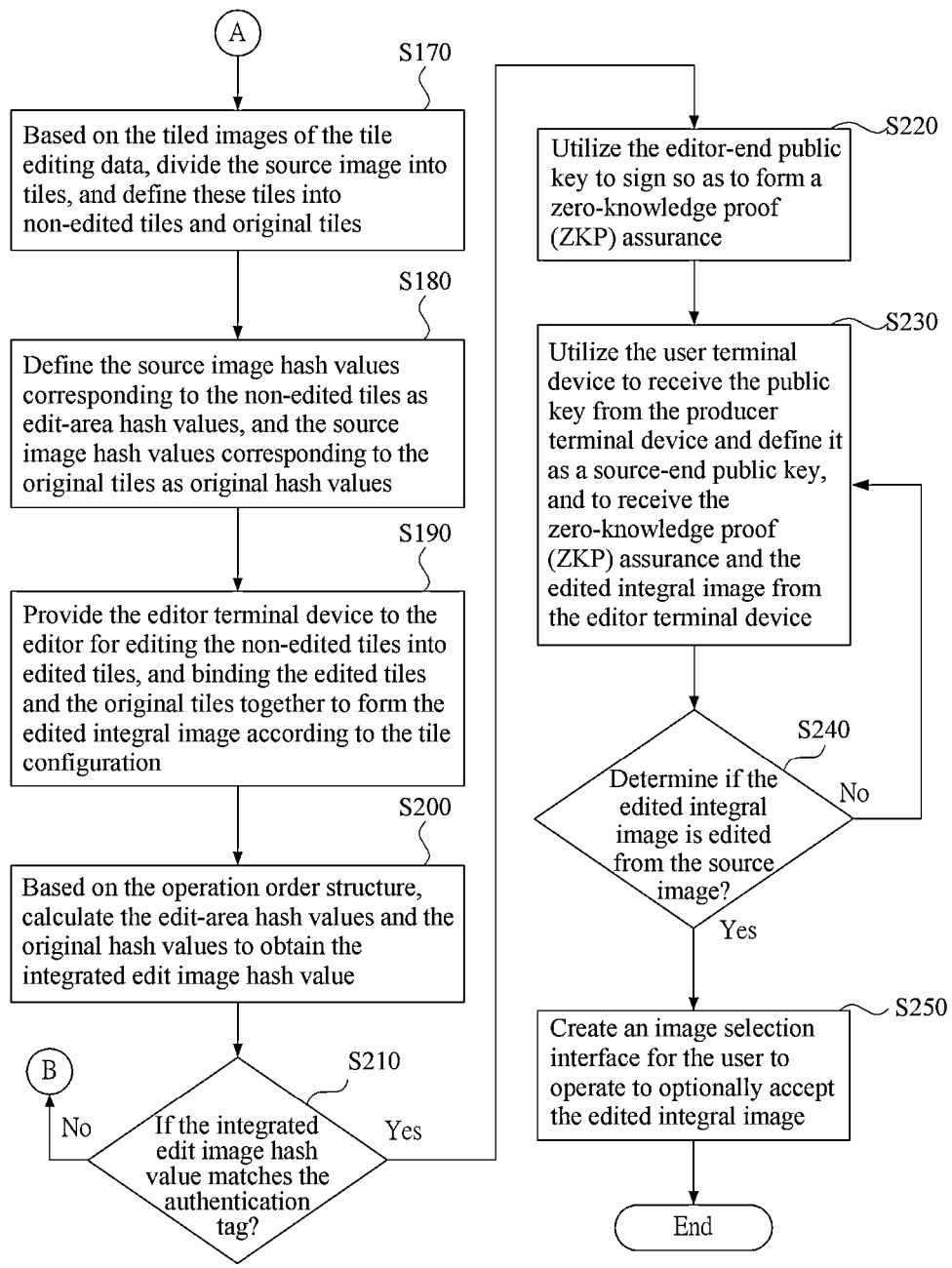

Referring to FIG. 15A and FIG. 15B together, a simplified flowchart of a preferred embodiment of the method for verifying edited image in accordance with the present invention is integrally shown schematically. In this embodiment, the producer terminal device 1 of the aforesaid verification system 100, an editor terminal device 2 and a user terminal device 3 are separately installed, but are functionally related after executing the android package kit APK.

Firstly, a key pair KP can be pre-stored in the storage module 11 of the producer terminal device 1, and this key pair KP can include a public key PUK and a private key PRK (Step S110). In addition, the source image Is is edited into a plurality of tiled images R0~R8 according to a tile configuration (Step S120).

Then, the producer terminal device 1 is utilized to follow the operation order structure to assign the tiled images R0~R8 with corresponding source image hash values H0~H8, such that the tile editing data (as shown in Table 1) can be formed. In this embodiment, the operation order structure can be the aforesaid Merkle-tree operation order structure (Step S130). Then, the producer terminal device 1 is utilized to generate an integrated source image hash value HI by calculating the source image hash values H0~H8 in accordance with the operation order structure (Step S140). Then, the private key PRK is used to sign the integrated source image hash value so as to form a corresponding authentication tag t, and the source image Is and the authentication tag t are further bound together to form an image-tag pair (Is,τ) (Step S150).

Then, the editor terminal device 2 is utilized to receive the tile editing data and the image-tag pair (Is,τ), and also to have the received public key to be defined as an editor-end public key PUK-E (Step S160). Then, the editor terminal device 2 is utilized to tile the source image Is into tiles I0~I8 according to the tiled images R0~R8 of the tile editing data, and to define these tiles I0~I8 into non-edited tiles Ie2 and Ie4 and original tiles Io0, Io1, Io3 and Io5~Io8 (Step S170).

Then, the editor terminal device 2 is utilized to define source image hash values H2 and H4 corresponding to the non-edited tiles Ie2 and Ie4 as edit-area hash values He2 and He4, to define source image hash values H0, H1, H3 and H5~H8 corresponding to the original tiles Io0, Io1, Io3 and Io5~Io8 as original hash values Ho0, Ho1, Ho3 and Ho5~Ho8, respectively (Step S180). Further, the editor terminal device 2 can be operated by the editor to edit the non-edited tiles Ie2 and Ie4 into edited tiles Ied2 and Ied4, respectively, and to bind the edited tiles Ied2 and Ied4 and the original tiles Io0, Io1, Io3 and Io5~Io8 together to form the edited integral image Ied, according to the tile configuration (Step S190).

Then, according to the operation order structure, the editor terminal device 2 is utilized to calculate the edit-area hash values He2 and He4 and the original hash values Ho0, Ho1, Ho3 and Ho5~Ho8 so as to obtain the integrated edit image hash value HeI Step S200), and to compare the integrated edit image hash value HeI with the authentication tag τ (including the integrated source image hash value HI) (Step S210). If the comparison is positive, then the editor-end public key would be used to sign and form a zero-knowledge proof (ZKP) assurance (i.e., the photo assurance π) (Step S220). On the other hand, if the comparison is negative, then go back to Step S160 to receive again the tile editing data, the image-tag pair (Is,τ) and the editor-end public key PUK-E.

Finally, the user terminal device 3 is utilized to receive the public key PUK from the producer terminal device 1 and define it as a source-end public key PUK-S, and to receive the zero-knowledge proof (ZKP) assurance (i.e., the photo assurance π, including the editor-end public key PUK-E) and the edited integral image Ied from the editor terminal device 2 (Step S230), and to verify whether or not the edited integral image Ied is edited from the source image Is, according to the source-end public key source-end public key PUK-S and the photo assurance π (Step S240).

In Step S240, if is confirmed that the edited integral image Ied is obtained by editing the source image Is, then an image selection interface 33 is created for the user to operate the user terminal device 3 to optionally accept the edited integral image (Step S250). If the verification in Step S240 tells that the edited integral image Ied is not generated from editing the source image Is, then go back to Step S230 for receiving again the source-end public key PUK-S, the photo assurance π and the edited integral image Ied.

In order to verify that the technique provided in this disclosure is superior to the aforementioned "PhotoProof technology" published in 2016 (used as the prior art in Table 2 as follows) in image processing and verification efficiency, the following comparisons in operation time and storage space for program executions would be focused on a typical example with a source image having a total image size of 128×128 and an 64×64 image for the edit image sizes (i.e., the image size for the non-edited tile). The comparison results are listed in Table 2 as follows. From Table 2, it is confirmed that the operation time needed by this disclosure is significantly shorter than that by the prior art, and the storage space required by this disclosure is much smaller than that by the prior art. Undoubtedly, this disclosure can provide better performance than the prior art in the image processing and the verification efficiency.

TABLE 2

Comparisons of processing efficiency

| Comparison terms | | Prior art | This disclosure |
|---|---|---|---|
| Operation time (seconds) | Key generation and hash computation | about 367 | about 25 |
| | Proof | 306 | 5 |
| | Verification | 0.5 | 0.5 |
| Storage space (KB) | Key and hash value | $2.6 \times 10^6$ | 2.67 |
| | Photo assurance specs | $4 \times 10^3$ | ≤2 |

In summary, in the image-editing verification technique provided in this disclosure, since the source image is tiled into a plurality of smaller tiles with individual source image hash values, thus only part of these smaller tiles need to be edited. In addition, the hash computations and comparisons are carried out before and also after the editing so as to verify whether or not the edited integral image is obtained from editing the original source image. Further, by integrating the key comparisons and zero-knowledge proof technology, only the operator of the producer terminal device 1 and the editor terminal device 2 can have a full look of the source image Is, such that the original content of the source image Is can be protected from the user (i.e., the operator of the user terminal device 3) and the public persons. Thereupon, advantages in privacy protection at personal data and portraits can be obtained. Also, due to the tiling process, after experiments (results are shown in Table 2), evidences have been found in saving the computation time and in reducing the storage space, and thus the effect of improving the efficiency of image verification in this disclosure is achieved.

While the present invention has been particularly shown and described with reference to a preferred embodiment, it will be understood by those skilled in the art that various changes in form and detail may be without departing from the spirit and scope of the present invention.

What is claimed is:

1. A system for verifying edited image, comprising:
    a producer terminal device, having a private key and a public key, configured for providing a source image, the source image being edited into a plurality of tiled images according to a tile configuration, the plurality of tiled images being provided with a plurality of source image hash values according to an operation order structure for generating a tile editing data, the plurality of source image hash values being calculated to generate an integrated source image hash value according to the operation order structure, the integrated source image hash value being signed by the private key to generate an authentication tag, the source image and the authentication tag being bound to form an image-tag pair;
    an editor terminal device, connected signally with the producer terminal device, configured for receiving the tile editing data and the image-tag pair, receiving the public key defined as an editor-end public key, and tiling the source image into a plurality of tiles according to the plurality of tiled images of the tile editing data; the plurality of tiles being further divided into at least one non-edited tile and at least one original tile, at least one said source image hash value corresponding to the at least one non-edited tile being defined as at least one non-edited region hash value, at least one of the rest of the plurality of source image hash values corresponding to the at least one original tile being defined as at least one original hash value, an editor editing the at least one non-edited tile into at least one edited tile, the at least one edited tile and the at least one original tile being bound into an edited integral image according to the tile configuration, the at least one non-edited region hash value and the at least one original hash value being calculated to generate an integrated edit image hash value according to the operation order structure; wherein, after the integrated edit image hash value is compared to the authentication tag and a positive result is obtained, the editor-end public key is used to sign so as to generate a zero-knowledge proof (ZKP) assurance; and
    a user terminal device, connected signally with the producer terminal device and the editor terminal device, configured for receiving the public key from the producer terminal device to be defined further as a source-end public key, receiving the zero-knowledge proof (ZKP) assurance and the edited integral image from the editor terminal device, and verifying, according to the source-end public key and the zero-knowledge proof (ZKP) assurance, whether or not the edited integral image is obtained from editing the source image.

2. The system for verifying edited image of claim 1, wherein the producer terminal device is installed with an android package kit; wherein, after the android package kit is executed, a hash computation module is created to calculate the plurality of source image hash values for generating the integrated source image hash value, according to the operation order structure.

3. The system for verifying edited image of claim 1, wherein the producer terminal device is installed with an android package kit; wherein, after the android package kit is executed, a signature module is created to utilize the private key to sign the integrated source image hash value for generating the authentication tag, and the source image and the authentication tag are combined to be the image-tag pair.

4. The system for verifying edited image of claim 1, wherein the editor terminal device is installed with an android package kit; wherein, after the android package kit is executed, an image tiling module is created; wherein the image tiling module tiles the source image into the plurality of tiles according to the plurality of tiled images of the tile editing data, the plurality of tiles are further divided into the at least one non-edited tile and the at least one original tile, the at least one source image hash value corresponding to the at least one non-edited tile is defined as the at least one non-edited region hash value, and the at least one of the rest of the plurality of source image hash values corresponding to the at least one original tile is defined as the at least one original hash value.

5. The system for verifying edited image of claim 1, wherein the editor terminal device is installed with an android package kit; wherein, after the android package kit is executed, a first zero-knowledge proof module including an image edit unit is created, and the image edit unit is provided for the editor to edit the at least one non-edited tile into the at least one edited tile.

6. The system for verifying edited image of claim 5, wherein the first zero-knowledge proof module further includes an image synthesis unit, and the image synthesis unit produces the edited integral image by binding the at least one edited tile and the at least one original tile according to the tile configuration.

7. The system for verifying edited image of claim 6, wherein the first zero-knowledge proof module further includes a hash computation unit, and the integrated edit image hash value is obtained by having the hash computation unit to calculate the at least one non-edited region hash value and the at least one original hash value according to the operation order structure.

8. The system for verifying edited image of claim 6, wherein the first zero-knowledge proof module further includes an assurance generation unit; wherein, after the assurance generation unit compares the integrated edit image hash value to the authentication tag and obtains a positive result, the editor-end public key is used to sign for generating the zero-knowledge proof (ZKP) assurance.

9. The system for verifying edited image of claim 1, wherein the user terminal device is installed with an android package kit, a second zero-knowledge proof module is created after the android package kit is executed, and the second zero-knowledge proof module is to verify, according to the source-end public key and the zero-knowledge proof (ZKP) assurance, whether or not the edited integral image is obtained from editing the source image.

10. The system for verifying edited image of claim 1, wherein the operation order structure is a Merkle-tree operation order structure, the plurality of source image hash values are calculated to generate the integrated source image hash value according to the Merkle-tree operation order structure, and the at least one non-edited region hash value and the at least one original hash value are also calculated to generate the integrated edit image hash value according to the Merkle-tree operation order structure.

* * * * *